US012126123B2

(12) United States Patent
Cheng

(10) Patent No.: US 12,126,123 B2
(45) Date of Patent: Oct. 22, 2024

(54) USB ELECTRONIC DEVICE HAVING FUNCTIONALITY OF ELECTRIC LEAKAGE PROTECTION

(71) Applicant: ACTION STAR TECHNOLOGY CO., LTD., New Taipei (TW)

(72) Inventor: Ching-Wei Cheng, Keelung (TW)

(73) Assignee: ACTION STAR TECHNOLOGY CO., LTD., New Taipei (TW)

( * ) Notice: Subject to any disclaimer, the term of this patent is extended or adjusted under 35 U.S.C. 154(b) by 174 days.

(21) Appl. No.: 17/974,517

(22) Filed: Oct. 27, 2022

(65) Prior Publication Data

US 2024/0097383 A1 Mar. 21, 2024

(30) Foreign Application Priority Data

Sep. 15, 2022 (TW) ................................ 111134944

(51) Int. Cl.
*H01R 13/66* (2006.01)

(52) U.S. Cl.
CPC ..... *H01R 13/6666* (2013.01); *H01R 13/6683* (2013.01)

(58) Field of Classification Search
CPC ............ H01R 13/6683; H01R 13/6666; H01R 25/003; H01R 27/02
USPC .................................................. 361/118, 42
See application file for complete search history.

(56) References Cited

U.S. PATENT DOCUMENTS

| | | | | |
|---|---|---|---|---|
| 10,574,070 | B1 * | 2/2020 | Li | G06F 13/4282 |
| 2018/0097629 | A1 | 4/2018 | Soffer | |
| 2019/0109480 | A1 | 4/2019 | Hsu et al. | |
| 2019/0157894 | A1 * | 5/2019 | Shalaby | H01R 27/02 |
| 2021/0002170 | A1 * | 1/2021 | Chien | H05B 45/30 |

FOREIGN PATENT DOCUMENTS

| | | |
|---|---|---|
| TW | 201840085 | 11/2018 |

OTHER PUBLICATIONS

Search Report for Taiwan counterpart application TW111134944, date Jul. 13, 2023.
(English translation) Search Report for Taiwan counterpart application TW111134944, date Jul. 13, 2023.

* cited by examiner

*Primary Examiner* — Kevin J Comber

(57) ABSTRACT

An USB electronic device having functionality of electric leakage protection is discloses. The USB electronic device comprises: a power interface, a power conversion circuit, a system controller, a circuit assembly, and a plurality of USB interfaces, of which the USB interfaces consists of at least one first USB interface and at least one second USB interface, and the first USB interface and the second USB interface both include an electrical terminal for supporting a power delivery (PD) communication protocol. In addition, there is an electric leakage preventing circuit provided in the USB electronic device. As such, in case of a power signal being transmitted between the first/second USB interface and an external electronic device by using the PD communication protocol, the electric leakage preventing circuit is enabled to prevent the power signal has a current leakage occurring between the first/second USB interface and the external electronic device.

8 Claims, 11 Drawing Sheets

USB ELECTRONIC DEVICE HAVING FUNCTIONALITY OF ELECTRIC LEAKAGE PROTECTION

BACKGROUND OF THE INVENTION

1. Field of the Invention

The present invention relates to the technology field of USB electronic devices, and more particularly to an USB electronic device having functionality of electric leakage protection.

2. Description of the Prior Art

Universal serial bus (USB) is an industry standard that establishes specifications for cables, connectors and protocols for connection, communication and power supply (interfacing) between computers, peripherals and other computers. The universal serial bus is classified into USB 2.0 (480 Mbps), USB 3.0 (5 Gbps), USB 3.1 (100 Gbps), and USB 3.2 (20 Gbps) on the basis of transmission speed. As described in more detail below, there are a variety of types of USB interfaces/electrical connectors developed, of which suitable interface types for USB 3.0 include Type-A, Type-B, Mini-A, and Mini-B. However, the appropriate interface type for both USB 3.1 and USB 3.2 is merely Type-C.

Engineers skilled in development and manufacture of USB electronic devices certainly know that, USB Type-C interface is designed to have an extra CC pin in comparison to USB Type-A interface and USB Type-B interface, such that a specific USB device having USB Type-C interface is allowed to be fast charged through a special technology of USB-C power delivery (PD). At present, USB-C power delivery is able to transmit direct current (DC) signal with the maximum current of 5 A and power of 10 W, 18 W, 36 W, 60 W, or 100 W.

With reference to FIG. 1, there is shown a block diagram of a conventional USB electronic device using USB Type-C interface. In FIG. 1, the USB electronic device 1*a* is coupled to an AC/DC power converter 3*a* by an USB Type-C interface thereof. As such, after converting an AC power signal (e.g., supply mains) to a DC power signal, the AC/DC power converter 3*a* transmits, by utilizing the technology of USB-C power delivery, the DC power signal to the USB Type-C interface of the USB electronic device 1*a*, thereby powering the USB electronic device 1*a*.

FIG. 2 illustrates a block diagram of the conventional USB electronic device and a host electronic device having USB Type-C interface. As FIG. 2 shows, it is allowable to make a first USB Type-C interface of the USB electronic device 1*a* be coupled to a second USB Type-C interface of a host electronic device 2*a*, and simultaneously make the host electronic device be coupled to the AC/DC power converter 3*a*. By such arrangements, after converting an AC power signal (e.g., supply mains) to a first DC power signal, the AC/DC power converter 3*a* transmits the DC power signal to the host electronic device 2*a*. Subsequently, the host electronic device 2*a* regulates the first DC power signal to a second DC power signal by using a voltage regulator 21*a* thereof, and then utilizes the second USB Type-C interface to transmit, through the technology of USB-C power delivery, the second DC power signal to the second USB Type-C interface of the USB electronic device 1*a*.

FIG. 3 illustrates a block diagram of the host electronic device and the conventional USB electronic device. As FIG. 3 shows, it is allowable to make a first USB Type-C interface of the USB electronic device 1*a* be coupled to a second USB Type-C interface of a host electronic device 2*a*, and simultaneously make the host electronic device be coupled to the AC/DC power converter 3*a*. By such arrangements, after converting an AC power signal (e.g., supply mains) to a first DC power signal, the AC/DC power converter 3*a* further regulates the first DC power signal to a second DC power signal by using a voltage regulator 31*a* thereof. Subsequently, the AC/DC power converter 3*a* transmits the first DC power signal to the host electronic device 2*a*, and transmits, by utilizing the technology of USB-C power delivery, the second DC power signal to the second USB Type-C interface of the USB electronic device 1*a*.

It is well known that, power converters and power devices (e.g., power bank) are commonly provided with an over voltage protection (OVP) circuit and/or an over current protection (OCP) circuit therein. For example, China patent No. CN203643941U has disclosed an AC/DC power source distribution management system including OVP and OCP functionalities, and China patent No. CN204517429U has disclosed a portable power source including OVP and OCP functionalities. On the other hand, since the USB-C power delivery is able to transmit direct current (DC) signal with the maximum current of 5 A and the maximum voltage of 20V (i.e., maximum power of 100 W), current leakage is an extremely important issue must be noted. However, it seems that there is still no current leakage preventing mechanism provided in the conventional USB electronic device 1*a*, the host electronic device 2*a* and/or the AC/DC power converter 3*a*.

According to above descriptions, it is understood that there are still rooms for improvement in the conventional electronic device having USB Type-C interface. In view of this fact, inventors of the present application have made great efforts to make inventive research and eventually provided an USB electronic device having functionality of electric leakage protection.

SUMMARY OF THE INVENTION

The primary objective of the present invention is to disclose an USB electronic device having functionality of electric leakage protection. The USB electronic device comprises: a power interface, a power conversion circuit, a system controller, a circuit assembly, and a plurality of USB interfaces, of which the USB interfaces consists of at least one first USB interface and at least one second USB interface, and the first USB interface and the second USB interface both include an electrical terminal for supporting a power delivery (PD) communication protocol. In addition, there is an electric leakage preventing circuit provided in the USB electronic device. As such, in case of a power signal being transmitted between the first/second USB interface and an external electronic device by using the PD communication protocol, the electric leakage preventing circuit is enabled to prevent the power signal has a current leakage occurring between the first/second USB interface and the external electronic device.

For achieving the primary objective mentioned above, the present invention provides a first embodiment of the USB electronic device, comprising:

a power interface;

an electric leakage preventing circuit, being coupled to the power interface;

a power conversion circuit, being coupled to the electric leakage preventing circuit, and receiving an AC power signal transmitted by the power interface via the electric leakage preventing circuit, so as to convert the AC power signal to a first DC power signal and a second DC power signal;

a system controller, being coupled to the power conversion circuit for receiving the first DC power signal;

a circuit assembly, being coupled to the power conversion circuit for receiving the second DC power signal, and also being coupled to the system controller; and a plurality of USB interfaces, being coupled to the circuit assembly;

wherein during the power conversion circuit receiving the AC power signal transmitted by the power interface, the electric leakage preventing circuit being enabled to prevent the AC power signal has a current leakage occurring between the power interface and the power conversion circuit.

In one embodiment, the electric leakage preventing circuit is further provided with an over voltage protection (OVP) circuit and/or an over current protection (OCP) circuit therein.

In one embodiment, the USB interfaces comprises:

at least one first USB interface;

at least one second USB interface; and at least one third USB interface, having an electrical terminal for supporting 5-volt power signal transmission;

wherein the first USB interface and the second USB interface both have at least one specific electrical terminal for supporting a power delivery (PD) communication protocol;

wherein the first USB interface and the second USB interface are adopted as an upstream port and a downstream port of said USB electronic device, respectively.

In one practicable embodiment, the USB electronic device further comprises at least one input/output (I/O) interface coupled to the circuit assembly, wherein the I/O interface is selected from a group consisting of video port, audio port, memory slot, Ethernet port, and RS232 port.

In one embodiment, the circuit assembly comprises:

a power management circuit, being controlled by the system controller, so as to allocate a plurality of interface DC power signals to be transmitted to the plurality of USB interfaces, respectively; and a logic circuit, comprising at least one electronic chip selected from a group consisting of USB HUB controller chip and USB router chip.

Moreover, the present invention further provides a second embodiment of the USB electronic device, comprising:

a power interface;

a power conversion circuit, being coupled to the power interface for receiving an AC power signal, and converting the AC power signal to a first DC power signal and a second DC power signal;

a system controller, being coupled to the power conversion circuit for receiving the first DC power signal;

an electric leakage preventing circuit, being coupled to the power conversion circuit;

a circuit assembly, being coupled to the electric leakage preventing circuit and the system controller, and receiving the second DC power signal transmitted by the power conversion circuit via the electric leakage preventing circuit; and a plurality of USB interfaces, being coupled to the circuit assembly;

wherein during the power conversion circuit transmitting the second DC power signal to the circuit assembly, the electric leakage preventing circuit being enabled to prevent the second DC power signal has a current leakage occurring between the power conversion circuit and the circuit assembly.

In one embodiment, the electric leakage preventing circuit is further provided with an over voltage protection (OVP) circuit and/or an over current protection (OCP) circuit therein.

In one embodiment, the USB interfaces comprises:

at least one first USB interface;

at least one second USB interface; and at least one third USB interface, having an electrical terminal for supporting 5-volt power signal transmission;

wherein the first USB interface and the second USB interface both have at least one specific electrical terminal for supporting a power delivery (PD) communication protocol;

wherein the first USB interface and the second USB interface are adopted as an upstream port and a downstream port of said USB electronic device, respectively.

In one practicable embodiment, the USB electronic device further comprises at least one input/output (I/O) interface coupled to the circuit assembly, wherein the I/O interface is selected from a group consisting of video port, audio port, memory slot, Ethernet port, and RS232 port.

In one embodiment, the circuit assembly comprises:

a power management circuit, being controlled by the system controller, so as to allocate a plurality of interface DC power signals to be transmitted to the plurality of USB interfaces, respectively; and a logic circuit, comprising at least one electronic chip selected from a group consisting of USB HUB controller chip and USB router chip.

In addition, the present invention further provides a third embodiment of the USB electronic device, comprising:

a power interface;

a power conversion circuit, being coupled to the power interface for receiving a DC power signal, and converting the DC power signal to a first DC power signal;

a system controller, being coupled to the power conversion circuit for receiving the first DC power signal;

an electric leakage preventing circuit, being coupled to the power interface;

a circuit assembly, being coupled to the electric leakage preventing circuit and the system controller, and receiving the DC power signal transmitted by the power interface via the electric leakage preventing circuit; and a plurality of USB interfaces, being coupled to the circuit assembly;

wherein during the power interface transmitting the DC power signal to the circuit assembly, the electric leakage preventing circuit being enabled to prevent the DC power signal has a current leakage occurring between the power interface and the circuit assembly.

In one embodiment, the electric leakage preventing circuit is further provided with an over voltage protection (OVP) circuit and/or an over current protection (OCP) circuit therein.

In one embodiment, the USB interfaces comprises:

at least one first USB interface;

at least one second USB interface; and at least one third USB interface, having an electrical terminal for supporting 5-volt power signal transmission;

wherein the first USB interface and the second USB interface both have at least one specific electrical terminal for supporting a power delivery (PD) communication protocol;

wherein the first USB interface and the second USB interface are adopted as an upstream port and a downstream port of said USB electronic device, respectively.

In one practicable embodiment, the USB electronic device further comprises at least one input/output (I/O) interface coupled to the circuit assembly, wherein the I/O interface is selected from a group consisting of video port, audio port, memory slot, Ethernet port, and RS232 port.

In one embodiment, the circuit assembly comprises:

a power management circuit, being controlled by the system controller, so as to allocate a plurality of interface DC power signals to be transmitted to the plurality of USB interfaces, respectively; and a logic circuit, comprising at least one electronic chip selected from a group consisting of USB HUB controller chip and USB router chip.

Furthermore, the present invention further provides a fourth embodiment of the USB electronic device, comprising:

a power interface;

a power conversion circuit, being coupled to the power interface for receiving an AC power signal, and converting the AC power signal to a first DC power signal and a second DC power signal;

a system controller, being coupled to the power conversion circuit for receiving the first DC power signal;

a circuit assembly, being coupled to the power conversion circuit for receiving the second DC power signal, and also being coupled to the system controller; and a plurality of USB interfaces, being coupled to the circuit assembly, and comprising:

at least one first USB interface, being provided with a first electric leakage preventing circuit therein; and at least one second USB interface, being provided with a second electric leakage preventing circuit therein;

wherein the first USB interface and the second USB interface both have a specific electrical terminal for supporting a power delivery (PD) communication protocol;

wherein the first USB interface and the second USB interface are adopted as an upstream port and a downstream port of said USB electronic device, respectively;

wherein during the first USB interface transmitting or receiving an interface DC power signal, the first electric leakage preventing circuit being enabled to prevent the interface DC power signal has a current leakage occurring in the first USB interface; and wherein during the second USB interface transmitting or receiving one interface DC power signal, the second electric leakage preventing circuit being enabled to prevent the interface DC power signal has a current leakage occurring in the second USB interface.

In one embodiment, the second USB interface and first USB interface are both provided an over voltage protection (OVP) circuit and/or an over current protection (OCP) circuit therein.

In one embodiment, the USB interfaces further comprises at least one third USB interface, which has an electrical terminal for supporting 5-volt power signal transmission.

In a practicable embodiment, the USB electronic device further comprises at least one input/output (I/O) interface coupled to the circuit assembly, wherein the I/O interface is selected from a group consisting of video port, audio port, memory slot, Ethernet port, and RS232 port.

In one embodiment, the circuit assembly comprises:

a power management circuit, being controlled by the system controller, so as to allocate a plurality of interface DC power signals to be transmitted to the plurality of USB interfaces, respectively; and a logic circuit, comprising at least one electronic chip selected from a group consisting of USB HUB controller chip and USB router chip.

On the other hand, the present invention further provides a fifth embodiment of the USB electronic device, comprising:

a power interface;

a power conversion circuit, being coupled to the power interface for receiving a DC power signal, and converting the DC power signal to a first DC power signal;

a system controller, being coupled to the power conversion circuit for receiving the first DC power signal;

a circuit assembly, being coupled to the power interface for receiving the DC power signal, and also being coupled to the system controller; and a plurality of USB interfaces, being coupled to the circuit assembly, and comprising:

at least one first USB interface, being provided with a first electric leakage preventing circuit therein; and at least one second USB interface, being provided with a second electric leakage preventing circuit therein;

wherein the first USB interface and the second USB interface both have a specific electrical terminal for supporting a power delivery (PD) communication protocol;

wherein the first USB interface and the second USB interface are adopted as an upstream port and a downstream port of said USB electronic device, respectively;

wherein during the first USB interface transmitting or receiving an interface DC power signal, the first electric leakage preventing circuit being enabled to prevent the interface DC power signal has a current leakage occurring in the first USB interface; and wherein during the second USB interface transmitting or receiving one interface DC power signal, the second electric leakage preventing circuit being enabled to prevent the interface DC power signal has a current leakage occurring in the second USB interface.

In one embodiment, the second USB interface and first USB interface are both provided an over voltage protection (OVP) circuit and/or an over current protection (OCP) circuit therein.

In one embodiment, the USB interfaces further comprises at least one third USB interface, which has an electrical terminal for supporting 5-volt power signal transmission.

In a practicable embodiment, the USB electronic device further comprises at least one input/output (I/O) interface coupled to the circuit assembly, wherein the I/O interface is selected from a group consisting of video port, audio port, memory slot, Ethernet port, and RS232 port.

In one embodiment, the circuit assembly comprises:

a power management circuit, being controlled by the system controller, so as to allocate a plurality of interface DC power signals to be transmitted to the plurality of USB interfaces, respectively; and a logic circuit, comprising at least one electronic chip selected from a group consisting of USB HUB controller chip and USB router chip.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe an USB electronic device having functionality of electric leakage protection according to the present invention, embodiments of the present invention will be described in detail with reference to the attached drawings hereinafter.

First Embodiment

Figure 1:
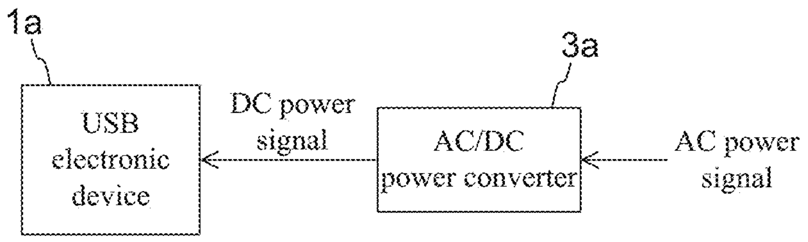
FIG. 1 (Prior art)
FIG. 1 shows a block diagram of a conventional USB electronic device using USB Type-C interface.
Figure 2:
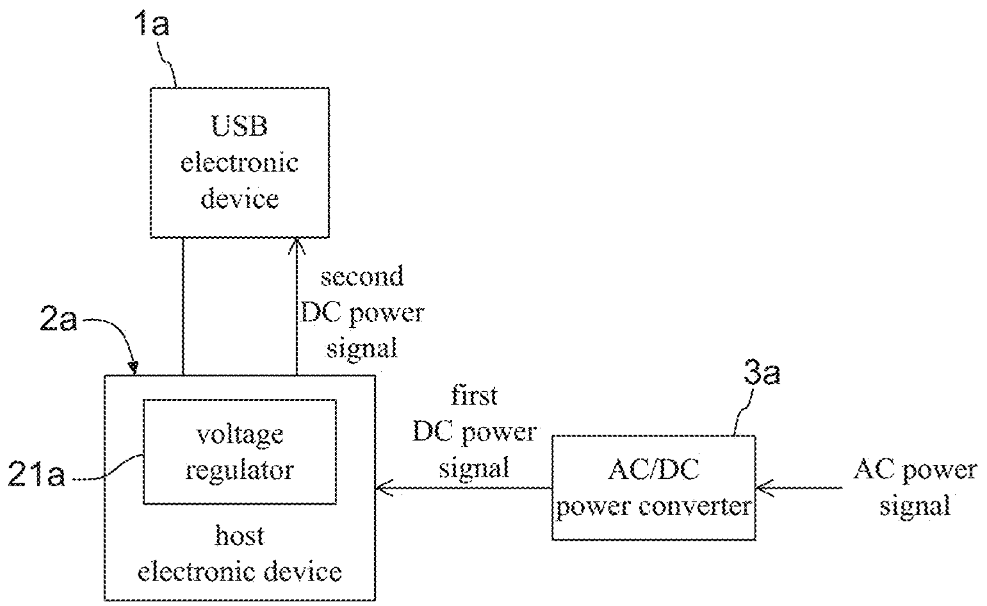
FIG. 2 (Prior art)
FIG. 2 shows a block diagram of the conventional USB electronic device and a host electronic device having USB Type-C interface.
Figure 3:
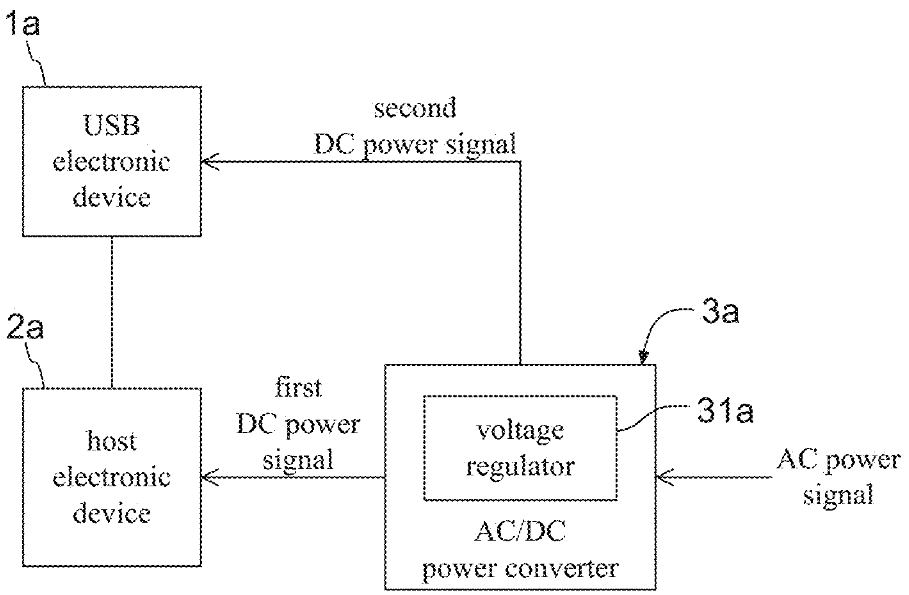
FIG. 3 (Prior art)
FIG. 3 shows a block diagram of the host electronic device and the conventional USB electronic device.
Figure 4:
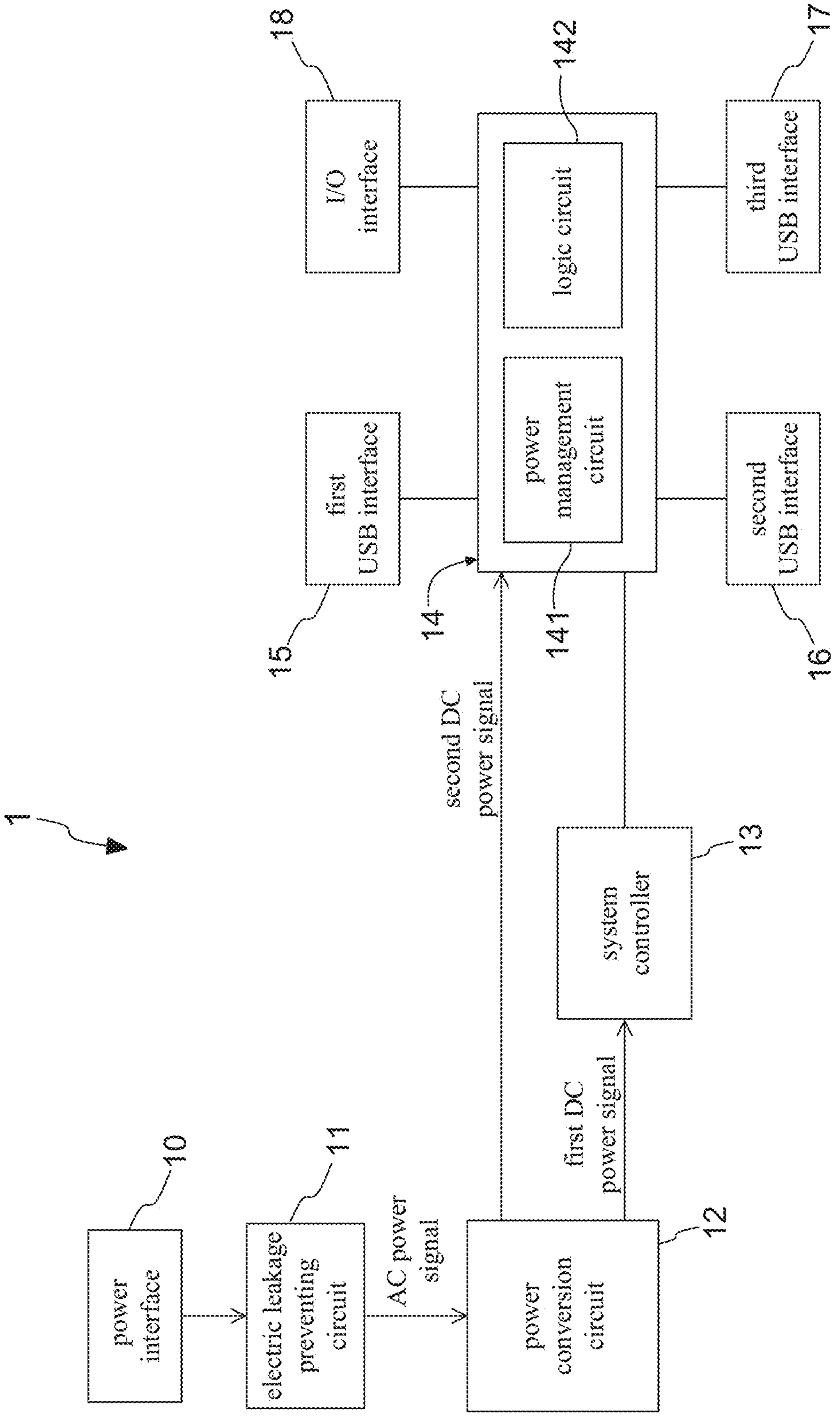
FIG. 4 shows a first block diagram of an USB electronic device having functionality of electric leakage protection according to the present invention.
Figure 5A:
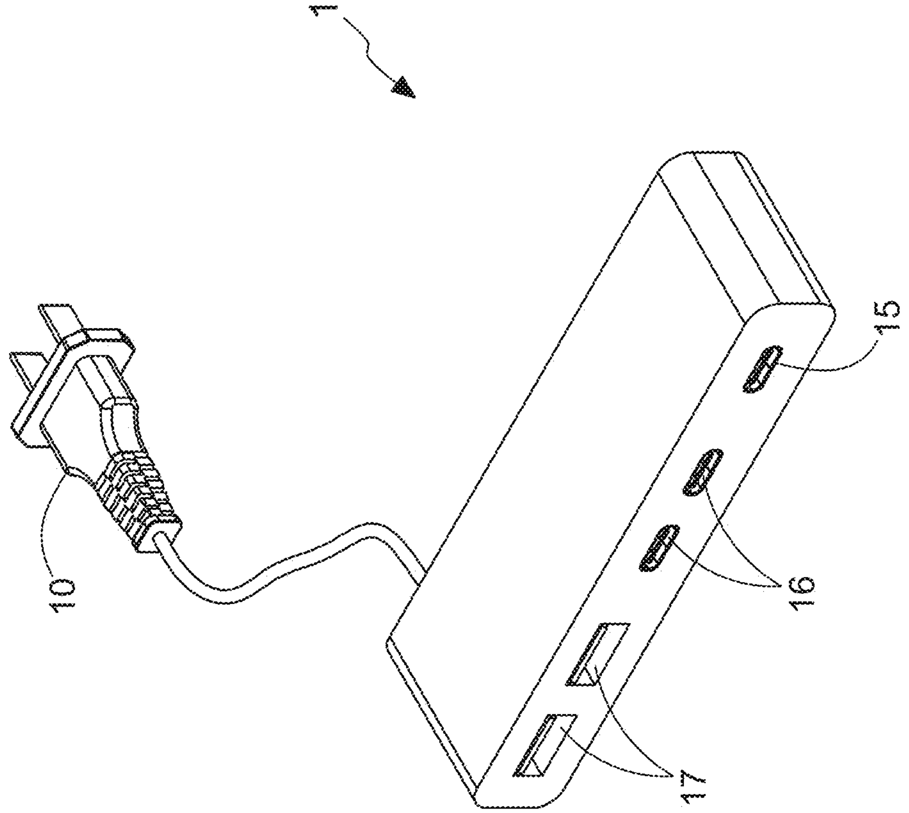
FIG. 5A shows a first schematic stereo view of the USB electronic device according to the present invention.
Figure 5B:
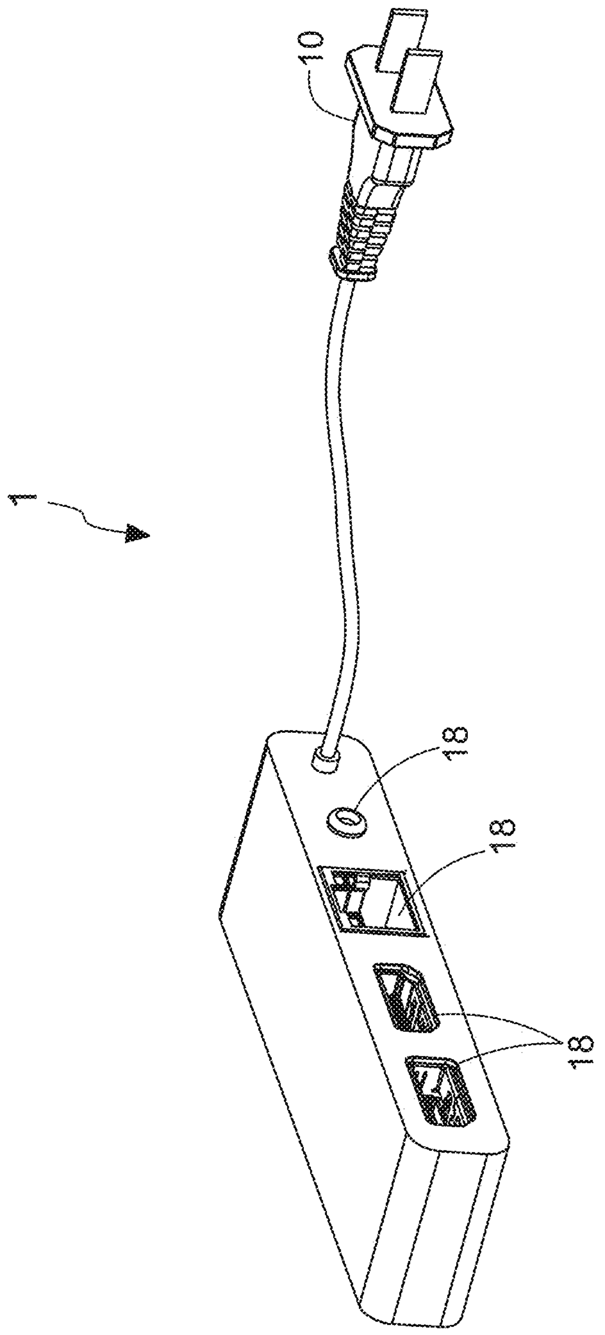
FIG. 5B shows a second schematic stereo view of the USB electronic device according to the present invention.

With reference to FIG. 4, there is provided a first block diagram of an USB electronic device having functionality of electric leakage protection according to the present invention. Moreover, FIG. 5A shows a first schematic stereo view of the USB electronic device, and FIG. 5B illustrates a second schematic stereo view of the USB electronic device. In first embodiment, the USB electronic device 1 is designed to comprise a power interface 10, an electric leakage preventing circuit 11, a power conversion circuit 12, a system controller 13, a circuit assembly 14, a plurality of USB interfaces (15, 16, 17), and an I/O interface 18. As FIG. 4, FIG. 5A and FIG. 5B show, the power interface 10 is adopted for be coupled to an AC power signal (e.g., supply mains), and the electric leakage preventing circuit 11 is coupled to the power interface 10. As described in more detail below, the power conversion circuit 12 is coupled to the electric leakage preventing circuit 11, and receives the AC power signal transmitted by the power interface 10 via the electric leakage preventing circuit 11, so as to convert the AC power signal to a first DC power signal and a second DC power signal.

As FIG. 4, FIG. 5A and FIG. 5B show, the plurality of USB interfaces include: at least one first USB interface 15, least one second USB interface 16 and least one third USB interface 17, of which the first USB interface 15 and the second USB interface 16 both have at least one specific electrical terminal for supporting a power delivery (PD) communication protocol. In addition, the third USB interface 17 has an electrical terminal for supporting 5-volt power signal transmission. In other words, the first USB interface 15 and the second USB interface 16 are both a USB Type-C interface (connector), and the third USB interface 17 can be an USB 3.0 Type-A connector, an USB 3.0 Type-B connector, an USB 3.0 Mini-A connector, or an USB 3.0 Mini-B connector. For example, FIG. 5A depicts that two USB 3.0 Type-A connectors are integrated in the USB electronic device 1 for being used as two said third USB interfaces 17.

As described in more detail below, the system controller 13 is coupled to the power conversion circuit 12 for receiving the first DC power signal. On the other hand, the circuit assembly 14 is coupled to the power conversion circuit 12 for receiving the second DC power signal, and is also coupled to the system controller 13. Moreover, the plurality of USB interfaces (15, 16, 17) are coupled to the circuit assembly 14. It is worth particularly explaining that, the USB electronic device 1 according to the present invention is allowed to be presented by a form of USB-C docking station, USB-C power bank, USB-C PD charger, USB-C HUB, or USB-C router. Therefore, the first USB interface 15 and the second USB interface 16 are adopted as an upstream port and a downstream port of said USB electronic device, 1 respectively. Moreover, as FIG. 4 shows, the circuit assembly 14 comprises a power management circuit 141 and a logic circuit 142. It is understood that, in case of the USB electronic device 1 is designed to be an USB-C HUB or an USB-C docking station, the logic circuit 142 certainly includes an USB HUB controller chip. On the other hand, if the USB electronic device 1 is designed to be a USB-C router, the logic circuit 142 certainly includes an USB router chip.

As described in more detail below, the power management circuit 141 is controlled by the system controller 13, so as to allocate a plurality of interface DC power signals to be transmitted to the plurality of USB interfaces (15, 16, 17), respectively. On the other hand, in case of the USB electronic device 1 is presented by a form of USB-C docking station, the USB electronic device 1 further comprises a plurality of I/O interfaces 18. As FIG. 5B show, the I/O interfaces 18 are video port, audio port, memory slot, Ethernet port, and RS232 port. According to the particular design of the present invention, during the power conversion circuit 12 receiving the AC power signal transmitted by the power interface 10, the electric leakage preventing circuit 11 is enabled to prevent the AC power signal has a current leakage occurring between the power interface 10 and the power conversion circuit 12. In addition, it is allowable to further integrate an over voltage protection (OVP) circuit and/or an over current protection (OCP) circuit in the electric leakage preventing circuit 11. As such, during the power conversion circuit 12 receiving the AC power signal, the OVP (OCP) circuit is enabled to protect the power conversion circuit 12, the system controller 13 and/or the circuit assembly 14 from being damaged due to suddenly-produced high voltage (current).

Second Embodiment

Figure 6:
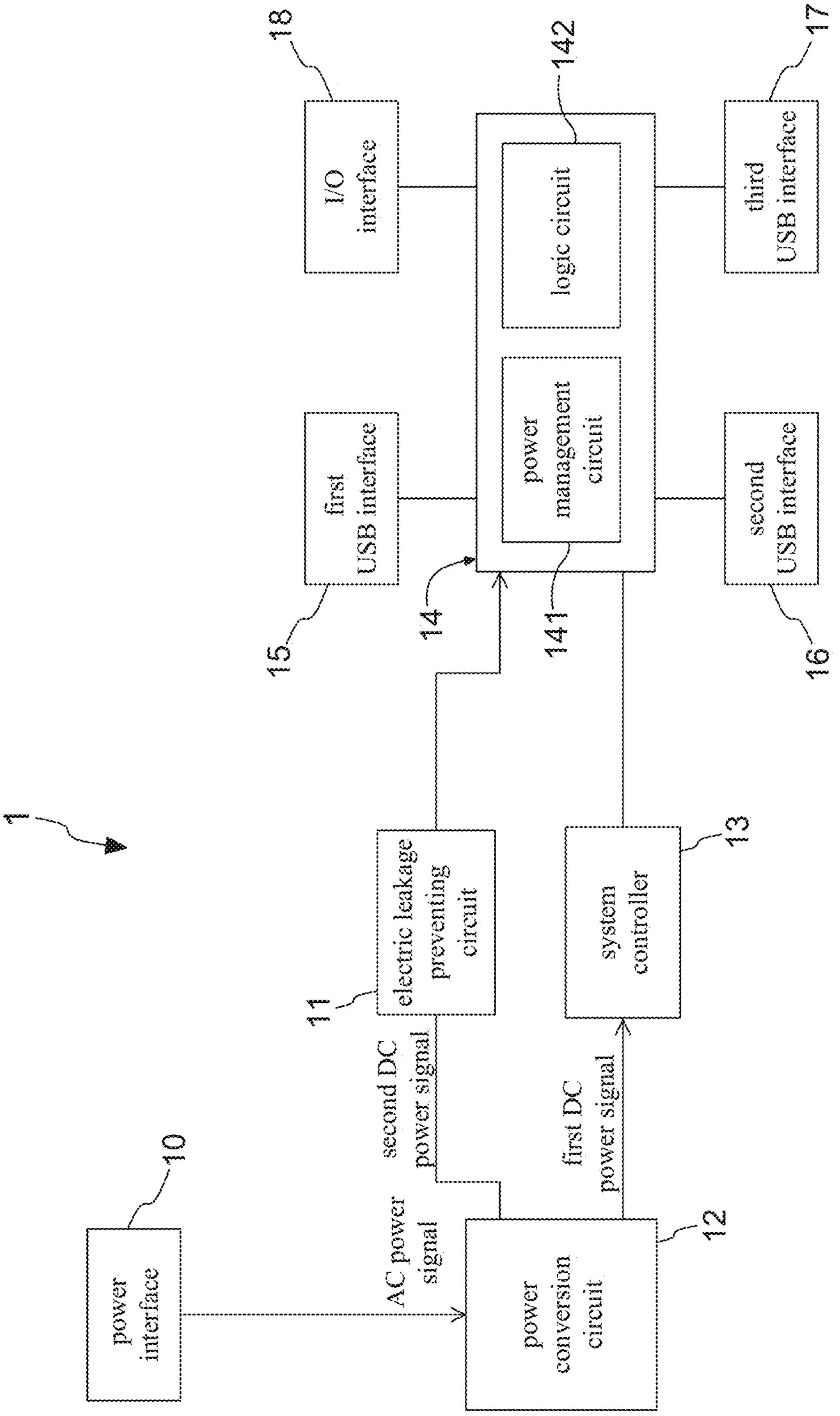
FIG. 6 shows a second block diagram of the USB electronic device according to the present invention.

With reference to FIG. 6, there is provided a second block diagram of an USB electronic device according to the present invention. In second embodiment, the power conversion circuit 12 is coupled to the power interface 10 for receiving an AC power signal, and converts the AC power signal to a first DC power signal and a second DC power signal. On the other hand, the system controller 13 is coupled to the power conversion circuit 12 for receiving the first DC power signal, and the electric leakage preventing circuit 11 is coupled to the power conversion circuit 12. Moreover, the circuit assembly 14 is coupled to the electric leakage preventing circuit 11, the system controller 13, and the plurality of USB interfaces (15, 16, 17), and receives the second DC power signal transmitted by the power conversion circuit 12 via the electric leakage preventing circuit 11. By such arrangements, during the power conversion circuit 12 transmitting the second DC power signal to the circuit assembly 14, the electric leakage preventing circuit 11 is enabled to prevent the second DC power signal has a current leakage occurring between the power conversion circuit 12 and the circuit assembly 14.

Likewise, it is allowable to further integrate an over voltage protection (OVP) circuit and/or an over current protection (OCP) circuit in the electric leakage preventing circuit 11 as shown in FIG. 6. As such, during the circuit assembly 14 receiving the second DC power signal, the OVP (OCP) circuit is enabled to protect the circuit assembly 14 from being damaged due to suddenly-produced high voltage (current).

Third Embodiment

Figure 7:
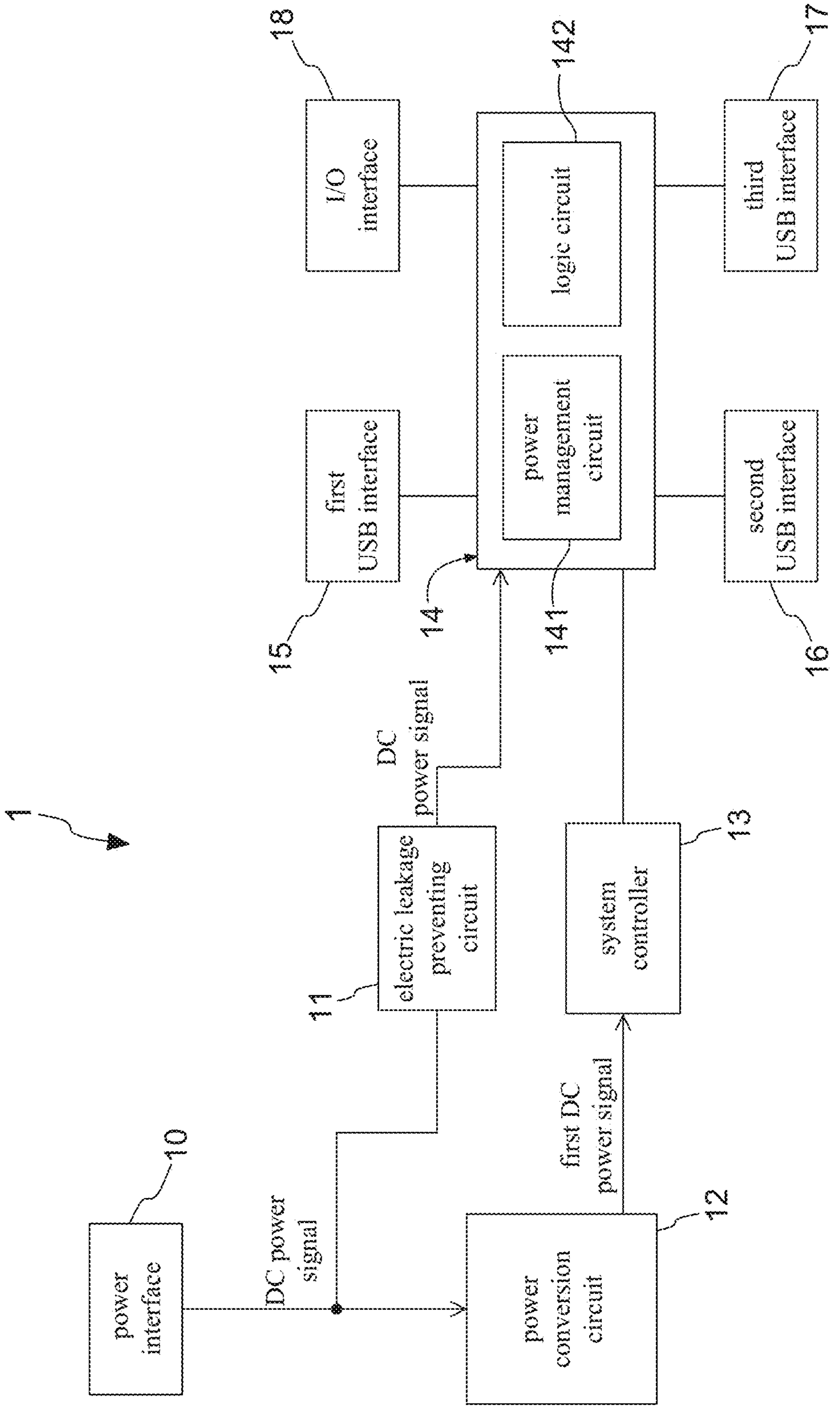
FIG. 7 shows a third block diagram of the USB electronic device according to the present invention.
Figure 8A:
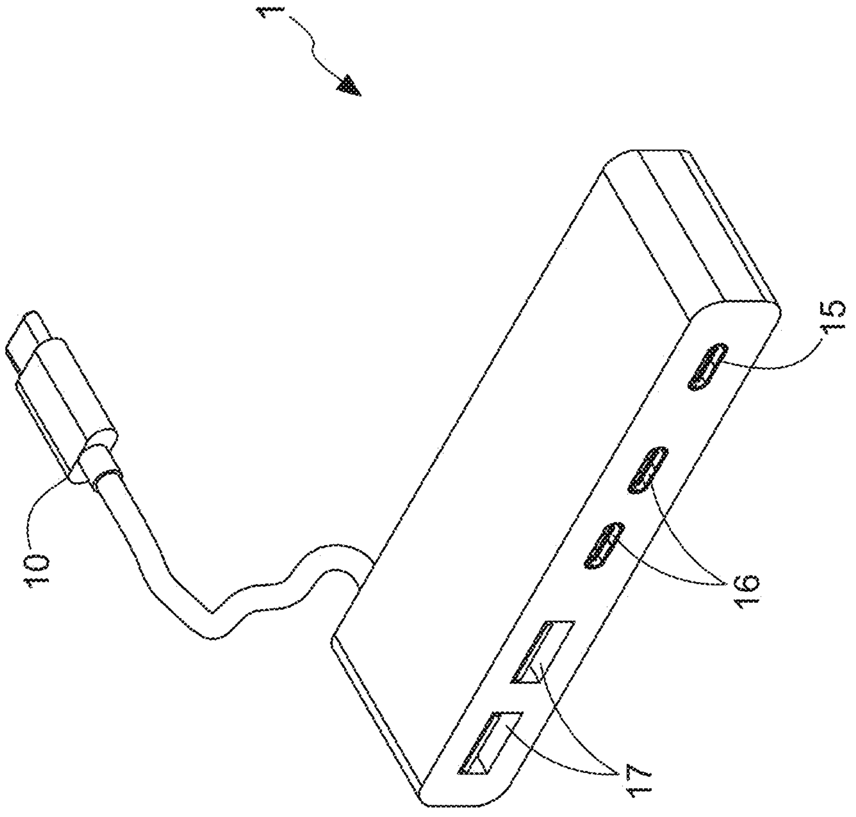
FIG. 8A shows a third schematic stereo view of the USB electronic device according to the present invention.
Figure 8B:
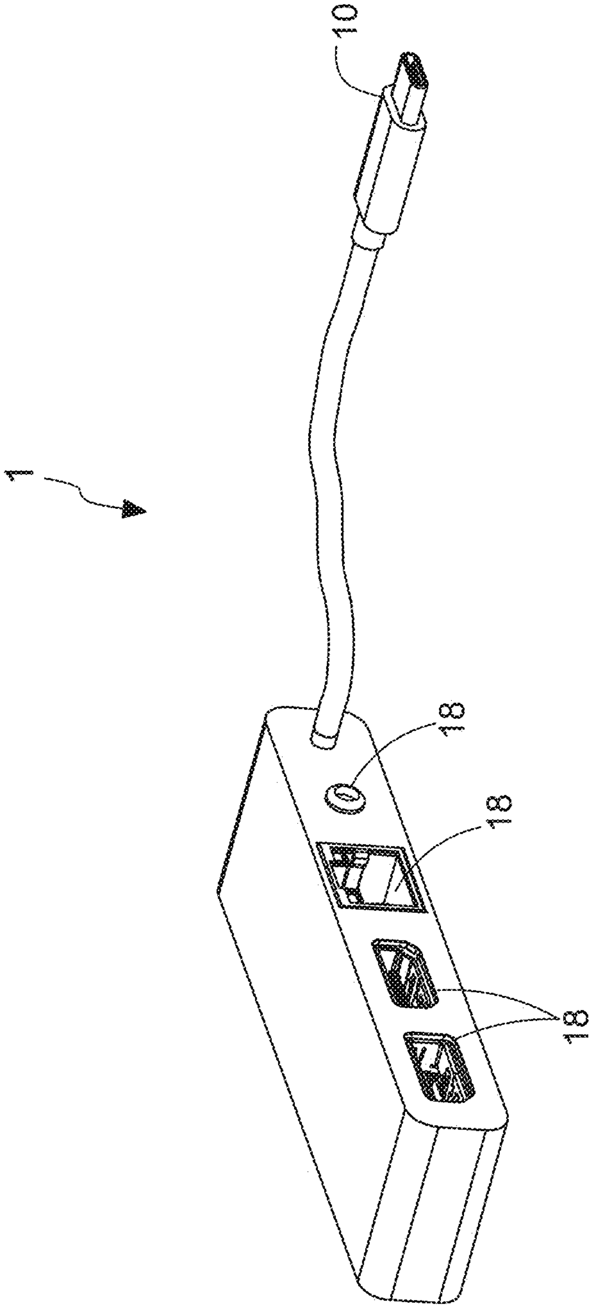
FIG. 8B shows a fourth schematic stereo view of the USB electronic device according to the present invention.

With reference to FIG. 7, there is provided a third block diagram of the USB electronic device according to the present invention. Moreover, FIG. 8A shows a third schematic stereo view of the USB electronic device, and FIG. 8B illustrates a fourth schematic stereo view of the USB electronic device. In the third embodiment, the USB electronic device 1 is designed to comprise a power interface 10, an electric leakage preventing circuit 11, a power conversion circuit 12, a system controller 13, a circuit assembly 14, a plurality of USB interfaces (15, 16, 17), and an I/O interface 18. As FIG. 7, FIG. 8A and FIG. 8B show, the power interface 10 is adopted for be coupled to a DC power signal transmitted by a power device, such as power bank, USB-C PD charger, or power adapter. Moreover, the power conversion circuit 12 is coupled to the power interface 10 for receiving a DC power signal, and converts the DC power signal to a first DC power signal. On the other hand, the system controller 13 is coupled to the power conversion circuit 12 for receiving the first DC power signal, the electric leakage preventing circuit 11 is coupled to the power interface 10, and the circuit assembly 14 is coupled to the electric leakage preventing circuit 11 and the system controller 13, so as to receive the DC power signal transmitted by the power interface 10 via the electric leakage preventing circuit 11. Moreover, the plurality of USB interfaces (15, 16, 17) are coupled to the circuit assembly 14.

According to the particular design of the present invention, during the power interface 10 transmitting the DC power signal to the circuit assembly 14, the electric leakage preventing circuit 11 is enabled to prevent the DC power signal has a current leakage occurring between the power interface 10 and the circuit assembly 14. Similarly, it is allowable to further integrate an over voltage protection (OVP) circuit and/or an over current protection (OCP) circuit in the electric leakage preventing circuit 11 as shown in FIG. 7. As such, during the circuit assembly 14 receiving the DC power signal, the OVP (OCP) circuit is enabled to protect the circuit assembly 14 from being damaged due to suddenly-produced high voltage (current).

Fourth Embodiment

Figure 9:
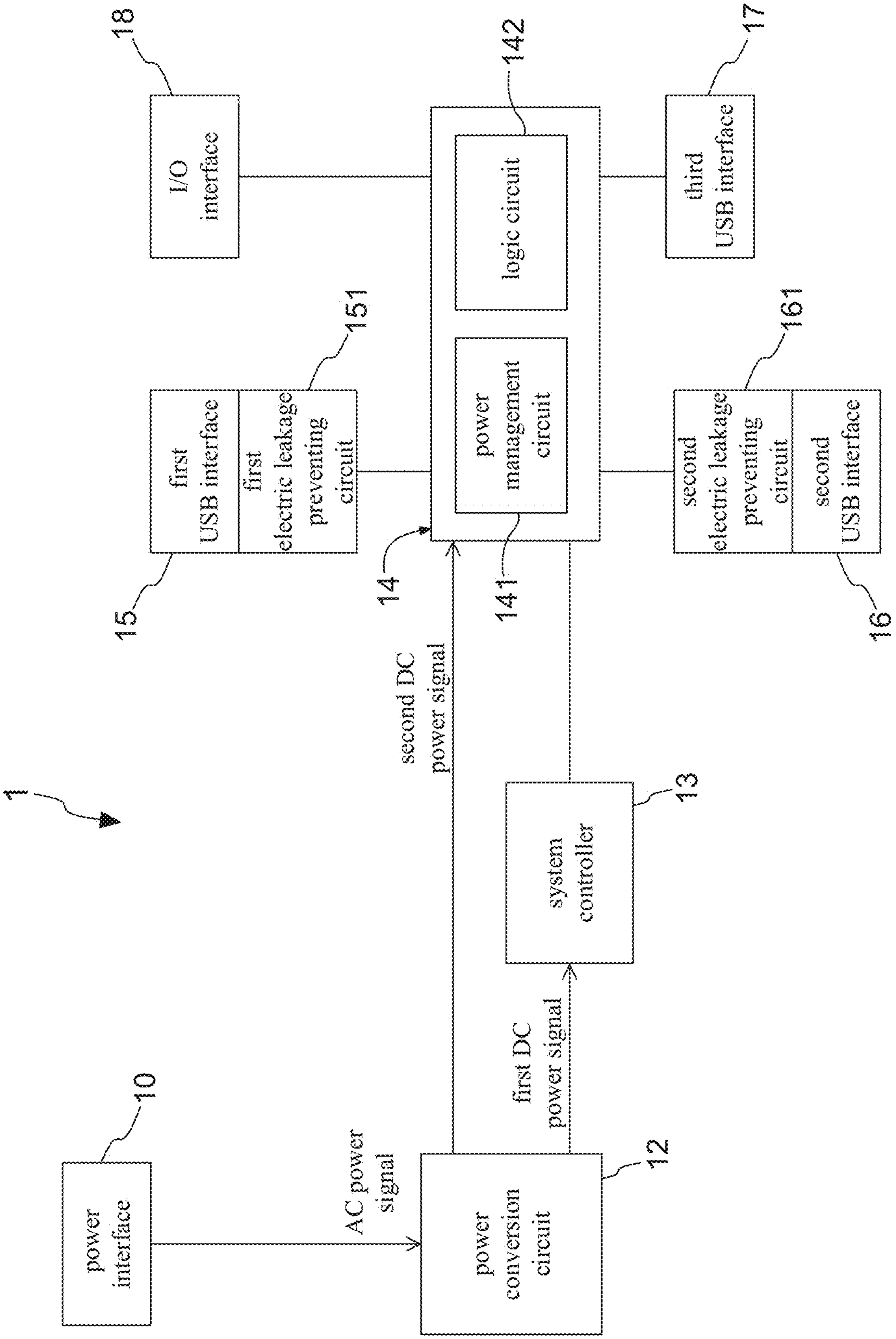
FIG. 9 shows a fourth block diagram of the USB electronic device according to the present invention.

Referring to FIG. 5A and FIG. 5B again, and please simultaneously refer to FIG. 9, in which a fourth block diagram of the USB electronic device according to the present invention is provided. In fourth embodiment, the USB electronic device 1 comprises: a power interface 10, a power conversion circuit 12, a system controller 13, a circuit assembly 14, a plurality of USB interfaces (15, 16, 17), and at least one I/O interface 18. As FIG. 9, FIG. 5A and FIG. 5B show, the power conversion circuit 12 is coupled to the power interface 10 for receiving an AC power signal, and converts the AC power signal to a first DC power signal and a second DC power signal. On the other hand, the system controller 13 is coupled to the power conversion circuit 12 for receiving the first DC power signal, and the circuit assembly 14 is coupled to the system controller 13 and the power conversion circuit 12 for receiving the second DC power signal. Moreover, the plurality of USB interfaces (15, 16, 17) are coupled to the circuit assembly 14.

As FIG. 9, FIG. 5A and FIG. 5B show, the plurality of USB interfaces (15, 16, 17) include at least one first USB interface 15, at least one second USB interface 16 and at least one third USB interface 17, of which the first USB interface 15 and the second USB interface 16 both have a specific electrical terminal for supporting a power delivery (PD) communication protocol, and the third USB interface 17 has an electrical terminal for supporting 5-volt power signal transmission. Particularly, in fourth embodiment, the first USB interface 15 is provided with a first electric leakage preventing circuit 151 therein, and the second USB interface 16 is also provided with a second electric leakage preventing circuit 161 therein. By such arrangements, during the first USB interface 15 transmitting or receiving an interface DC power signal, the first electric leakage preventing circuit 151 is enabled to prevent the interface DC power signal has a current leakage occurring in the first USB interface 15. Moreover, during the second USB interface 16 transmitting or receiving one interface DC power signal, the second electric leakage preventing circuit 161 is enabled to prevent the interface DC power signal has a current leakage occurring in the second USB interface 16.

In addition, the second USB interface 16 and first USB interface 15 are both provided an over voltage protection (OVP) circuit and/or an over current protection (OCP) circuit therein. As such, in case of an external electronic being coupled to the first USB interface 15, the interface DC power signal transmitted in the first USB interface 15 is protected, by the OVP (OCP) circuit, from having a suddenly-produced high voltage (current) between the external electronic device and the first USB interface 15 or between the first USB interface 15 and the circuit assembly 14. Similarly, after an external electronic is coupled to the second USB interface 16, the interface DC power signal transmitted in the second USB interface 16 is protected, by the OVP (OCP) circuit, from having a suddenly-produced high voltage (current) between the external electronic device and the second USB interface 16 or between the second USB interface 16 and the circuit assembly 14.

Fifth Embodiment

Figure 10:
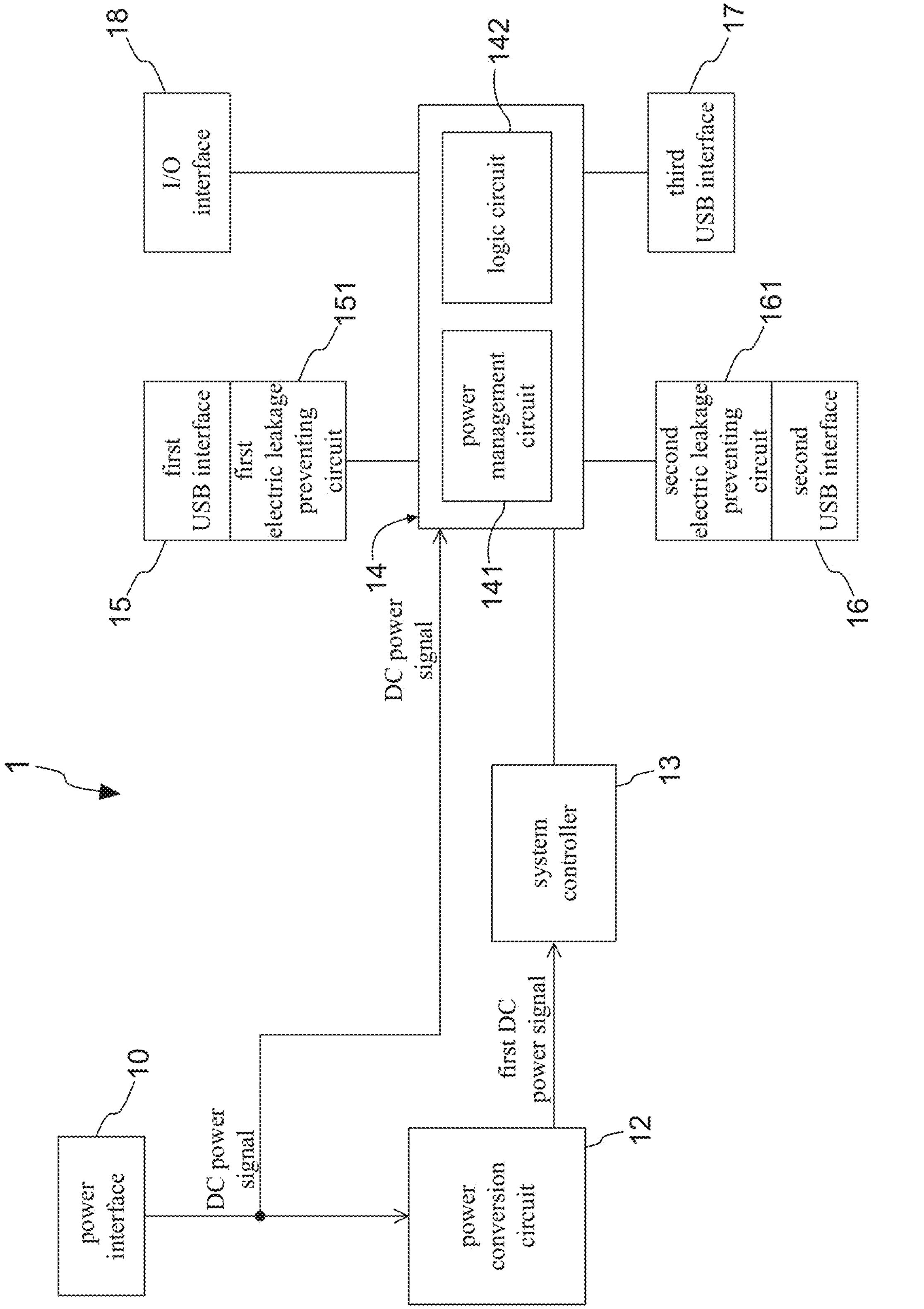
FIG. 10 shows a fifth block diagram of the USB electronic device according to the present invention.

Referring to FIG. 8A and FIG. 8B again, and please simultaneously refer to FIG. 10, in which a fifth block diagram of the USB electronic device according to the present invention is provided. In fifth embodiment, the USB electronic device 1 comprises: a power interface 10, a power conversion circuit 12, a system controller 13, a circuit assembly 14, a plurality of USB interfaces (15, 16, 17), and at least one I/O interface 18. As FIG. 10, FIG. 8A and FIG. 8B show, the power conversion circuit 12 is coupled to the power interface 10 for receiving a DC power signal, and converts the DC power signal to a first DC power signal. On the other hand, the system controller 13 is coupled to the power conversion circuit 12 for receiving the first DC power signal, and the circuit assembly 14 is coupled to the system controller 13 and the power interface 10 for receiving the DC power signal. Moreover, the plurality of USB interfaces (15, 16, 17) are coupled to the circuit assembly 14.

As FIG. 10, FIG. 8A and FIG. 8B show, the plurality of USB interfaces (15, 16, 17) include at least one first USB interface 15, at least one second USB interface 16 and at least one third USB interface 17, of which the first USB interface 15 and the second USB interface 16 both have a specific electrical terminal for supporting a power delivery (PD) communication protocol, and the third USB interface 17 has an electrical terminal for supporting 5-volt power signal transmission. Particularly, in fourth embodiment, the first USB interface 15 is provided with a first electric leakage preventing circuit 151 therein, and the second USB interface 16 is also provided with a second electric leakage preventing circuit 161 therein. By such arrangements, during the first USB interface 15 transmitting or receiving an interface DC power signal, the first electric leakage preventing circuit 151 is enabled to prevent the interface DC power signal has a current leakage occurring in the first USB interface 15. Moreover, during the second USB interface 16 transmitting or receiving one interface DC power signal, the second electric leakage preventing circuit 161 is enabled to prevent the interface DC power signal has a current leakage occurring in the second USB interface 16.

In addition, the second USB interface 16 and first USB interface 15 are both provided an over voltage protection (OVP) circuit and/or an over current protection (OCP) circuit therein. As such, in case of an external electronic being coupled to the first USB interface 15, the interface DC power signal transmitted in the first USB interface is protected, by the OVP (OCP) circuit, from having a suddenly-produced high voltage (current) between the external electronic device and the first USB interface 15 or between the first USB interface 15 and the circuit assembly 14. Similarly, after an external electronic is coupled to the second USB interface 16, the interface DC power signal transmitted in the second USB interface 16 is protected, by the OVP (OCP) circuit, from having a suddenly-produced high voltage (current) between the external electronic device and the second USB interface 16 or between the second USB interface 16 and the circuit assembly 14.

Therefore, through above descriptions, all embodiments and their constituting elements of the USB electronic device having functionality of electric leakage protection according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A USB electronic device, comprising:

a power interface;

a power conversion circuit, being coupled to the power interface for receiving an AC power signal, and converting the AC power signal to a first DC power signal and a second DC power signal;

a system controller, being coupled to the power conversion circuit for receiving the first DC power signal;

a circuit assembly, being coupled to the power conversion circuit for receiving the second DC power signal, and also being coupled to the system controller; wherein the circuit assembly comprises:

a power management circuit, being controlled by the system controller, so as to generate a plurality of interface DC power signals based on the second DC power signal; and a logic circuit, comprising at least one electronic chip selected from a group consisting of USB HUB controller chip and USB router chip;

a plurality of USB interfaces, being coupled to the power management circuit so as to respectively receive the plurality of interface DC power signals, and comprising:

at least one first USB Type-C interface, being provided with a first electric leakage preventing circuit therein; and at least one second USB Type-C interface, being provided with a second electric leakage preventing circuit therein;

wherein the first USB Type-C interface and the second USB Type-C interface both have a specific electrical terminal for supporting a power delivery (PD) communication protocol;

wherein the first USB Type-C interface and the second USB Type-C interface are adopted as an upstream port and a downstream port of said USB electronic device, respectively;

wherein during the first USB Type-C interface transmitting or receiving an interface DC power signal, the first electric leakage preventing circuit being enabled to prevent the interface DC power signal has a current leakage occurring in the first USB Type-C interface; and wherein during the second USB Type-C interface transmitting or receiving one interface DC power signal, the second electric leakage preventing circuit being enabled to prevent the interface DC power signal has a current leakage occurring in the second USB Type-C interface.

2. The USB electronic device of claim 1, wherein the second USB Type-C interface and first USB Type-C interface are both provided an over voltage protection (OVP) circuit and/or an over current protection (OCP) circuit therein.

3. The USB electronic device of claim 1, wherein the USB interfaces further comprises:

at least one third USB interface, having an electrical terminal for supporting 5-volt power signal transmission.

4. The USB electronic device of claim 1, further comprising: at least one input/output (I/O) interface coupled to the circuit assembly, wherein the I/O interface is selected from a group consisting of video port, audio port, memory slot, Ethernet port, and RS232 port.

5. A USB electronic device, comprising:

a power interface;

a power conversion circuit, being coupled to the power interface for receiving a DC power signal, and converting the DC power signal to a first DC power signal;

a system controller, being coupled to the power conversion circuit for receiving the first DC power signal;

a circuit assembly, being coupled to the power interface for receiving the DC power signal, and also being coupled to the system controller; wherein the circuit assembly comprises:

a power management circuit, being controlled by the system controller, so as to generate a plurality of interface DC power signals based on the DC power signal; and a logic circuit, comprising at least one electronic chip selected from a group consisting of USB HUB controller chip and USB router chip;

a plurality of USB interfaces, being coupled to the power management circuit so as to respectively receive the plurality of interface DC power signals, and comprising:

at least one first USB Type-C interface, being provided with a first electric leakage preventing circuit therein; and at least one second USB Type-C interface, being provided with a second electric leakage preventing circuit therein;

wherein the first USB Type-C interface and the second USB Type-C interface both have a specific electrical terminal for supporting a power delivery (PD) communication protocol;

wherein the first USB Type-C interface and the second USB Type-C interface are adopted as an upstream port and a downstream port of said USB electronic device, respectively;

wherein during the first USB Type-C interface transmitting or receiving an interface DC power signal, the first electric leakage preventing circuit being enabled to prevent the interface DC power signal has a current leakage occurring in the first USB Type-C interface; and wherein during the second USB Type-C interface transmitting or receiving one interface DC power signal, the second electric leakage preventing circuit being enabled to prevent the interface DC power signal has a current leakage occurring in the second USB Type-C interface.

6. The USB electronic device of claim 5, wherein the second USB Type-C interface and first USB Type-C interface are both provided an over voltage protection (OVP) circuit and/or an over current protection (OCP) circuit therein.

7. The USB electronic device of claim 5, wherein the USB interfaces further comprises:

at least one third USB interface, having an electrical terminal for supporting 5-volt power signal transmission.

8. The USB electronic device of claim 5, further comprising: at least one input/output (I/O) interface coupled to the circuit assembly, wherein the I/O interface is selected from a group consisting of video port, audio port, memory slot, Ethernet port, and RS232 port.

* * * * *